United States Patent
Loechner (10) Patent No.: US 6,781,807 B2
(45) Date of Patent: Aug. 24, 2004

(54) FIELD DEVICE POWER SUPPLY FAILURE DETECTION

(75) Inventor: Michael Loechner, Filderstadt (DE)

(73) Assignee: Invensys Systems, Inc., Foxboro, MA (US)

(*) Notice: Subject to any disclaimer, the term of this patent is extended or adjusted under 35 U.S.C. 154(b) by 157 days.

(21) Appl. No.: 09/983,889

(22) Filed: Oct. 26, 2001

(65) Prior Publication Data

US 2002/0064011 A1 May 30, 2002

(30) Foreign Application Priority Data

Oct. 27, 2000 (EP) .......................................... 00123342

(51) Int. Cl.$^7$ ................................................ H02H 3/24
(52) U.S. Cl. ....................................................... 361/92
(58) Field of Search ............................. 361/92, 88–90, 361/83

(56) References Cited

U.S. PATENT DOCUMENTS

| | | | | |
|---|---|---|---|---|
| 4,247,913 A | * | 1/1981 | Hiniker et al. ............... | 365/228 |
| 4,584,651 A | | 4/1986 | Carey, Jr. et al. | |
| 5,170,109 A | * | 12/1992 | Yanagita et al. ......... | 318/568.1 |
| 5,993,039 A | * | 11/1999 | Crill .............................. | 700/79 |
| 6,601,181 B1 | * | 7/2003 | Thomas ....................... | 713/340 |

FOREIGN PATENT DOCUMENTS

| | | | |
|---|---|---|---|
| DE | 19513910 | 10/1995 | ............ H02H/7/00 |
| WO | WO 99/45621 | 9/1999 | ............ H02H/9/00 |

OTHER PUBLICATIONS

European Patent Office, European Search Report #EP 00 12 3342, Mar. 20, 2001, The Hague.

* cited by examiner

Primary Examiner—Brian Sircus
Assistant Examiner—Boris Benenson
(74) Attorney, Agent, or Firm—Fish & Richardson, P.C.

(57) ABSTRACT

To detect a power supply failure on an intrinsically safe field bus of a manufacturing process control system in an efficient manner there is provided a field device with a discharge protection unit which is connected to a control bus for supply of an operating current from the control bus to the field device. The discharge protection unit inhibits a discharge of energy stored in the field device to the control bus. The field device also comprises a controller unit adapted to control the operation of the field device and being powered with the operating current from the control bus. According to the present invention the discharge protection unit comprises at least two rectifying elements inserted into the current path of the operating current with identical conducting directions and an input signal or an output signal of a selected rectifying element is supplied as interrupt signal to the controller unit for power supply failure detection.

23 Claims, 11 Drawing Sheets

FIELD DEVICE POWER SUPPLY FAILURE DETECTION

CROSS-REFERENCE TO RELATED APPLICATIONS

Under 35 U.S.C. 119, this application claims the benefit of a foreign application filed in EUROPE, and having Serial No. 0012342.8, filed Oct. 27, 2000, which is incorporated by reference in its entirety.

TECHNICAL FIELD

The present invention relates to a field device for monitoring a manufacturing process and for actuating manufacturing process variables, and being able to detect a power supply failure.

BACKGROUND

In general, field devices are used in a manufacturing process to monitor the process and to actuate process variables. Typically, actuators are placed in the manufacturing field to drive different process control elements, such as valves and sensors. Further, transmitters are installed in the manufacturing field to monitor process variables, such as fluid pressure, fluid temperature or fluid flow.

Actuators and transmitters are coupled to a control bus to receive and transmit process information to a centralized controller that monitors the overall operation of the manufacturing process. This control bus may be implemented as a two wire loop carrying a current that provides a power supply for operation of the field devices.

In such control systems, communication is typically executed through a field bus standard, which is a digital communication standard according to which transmitters may be coupled to only a single control bus to transmit sensed process variables to the central controller. Examples for communication standards include ISA 50.02-1992 section 11 and HART®, which overlays communication on a 4–20 mA processor variable signal.

Intrinsic safety is an important aspect of those control systems. When a field device is located in a hazardous area without explosion proof equipment, the electronics in the field device should be intrinsically safe. In general, intrinsic safety means that the electronics must be designed in a way that no sparks and no heat are generated thereby even when one or more electronic component failures occur at the same time.

Usually, intrinsic safety is achieved by having additional protective elements protect the electronics under a failure condition. Design specifications and certifications for the protective elements vary depending on the specific type of application (e.g., the type of explosive gas used within a manufacturing process).

Figure 1:
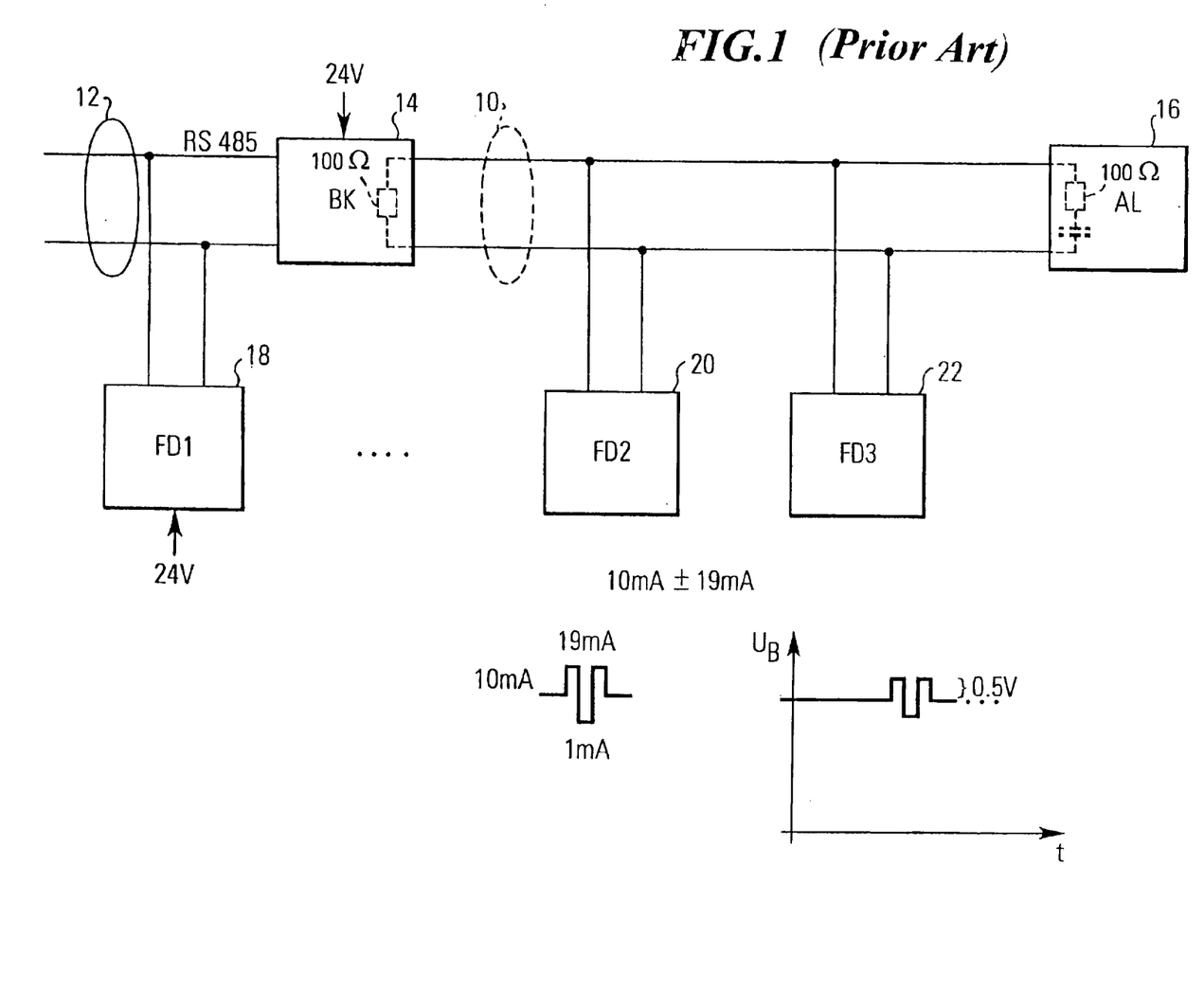
FIG. 1 shows peripheral parts of a manufacturing process control system.

FIG. 1 shows a peripheral part of a manufacturing process control system. As shown in FIG. 1, the peripheral part of the control system may comprise a first bus segment 10 of the intrinsic safe type and a second bus segment 12 using, e.g., the RS485 standard for data communication. The intrinsically safe field bus segment 10 and the RS485 bus segment 12 are coupled through a bus coupler 14. Further, the side of the intrinsically safe field bus segment 10 not attached to the bus coupler 14 is connected to a terminating circuit 16 that helps to avoid reflections on the intrinsically safe field bus segment 10.

As also shown in FIG. 1, to each bus segment 10, 12 there is connected at least one field device 18, 20, and 22. Each field device is either an actuator, a transmitter or another I/O device receiving/transmitting information. The field devices 20, 22 attached to the intrinsically safe field bus segment 10 may be powered through an electric current received from the intrinsically safe field bus segment 10 leading to a voltage drop across the field devices 20, 22. Typically, the intrinsically safe field bus segment 10 will be operated under a field bus protocol or any other appropriate protocol that allows for exchange of digital information.

As shown in FIG. 1, the field devices 20, 22 coupled to the intrinsically safe field bus segment 10 exchange information through modification of the current flowing into each field device 20, 22. For digital communication a basic value of the current of the intrinsically safe field bus segment 10 is modulated to be increased or decreased by predetermined offset value, such as 9 mA for the field bus standard. This modulation of the current flowing into either the field device 20 or the field device 22 leads to a modification of the voltage UB on the intrinsically safe field bus segment 10, with the voltage modification being used to provide digital communication.

Figure 2:
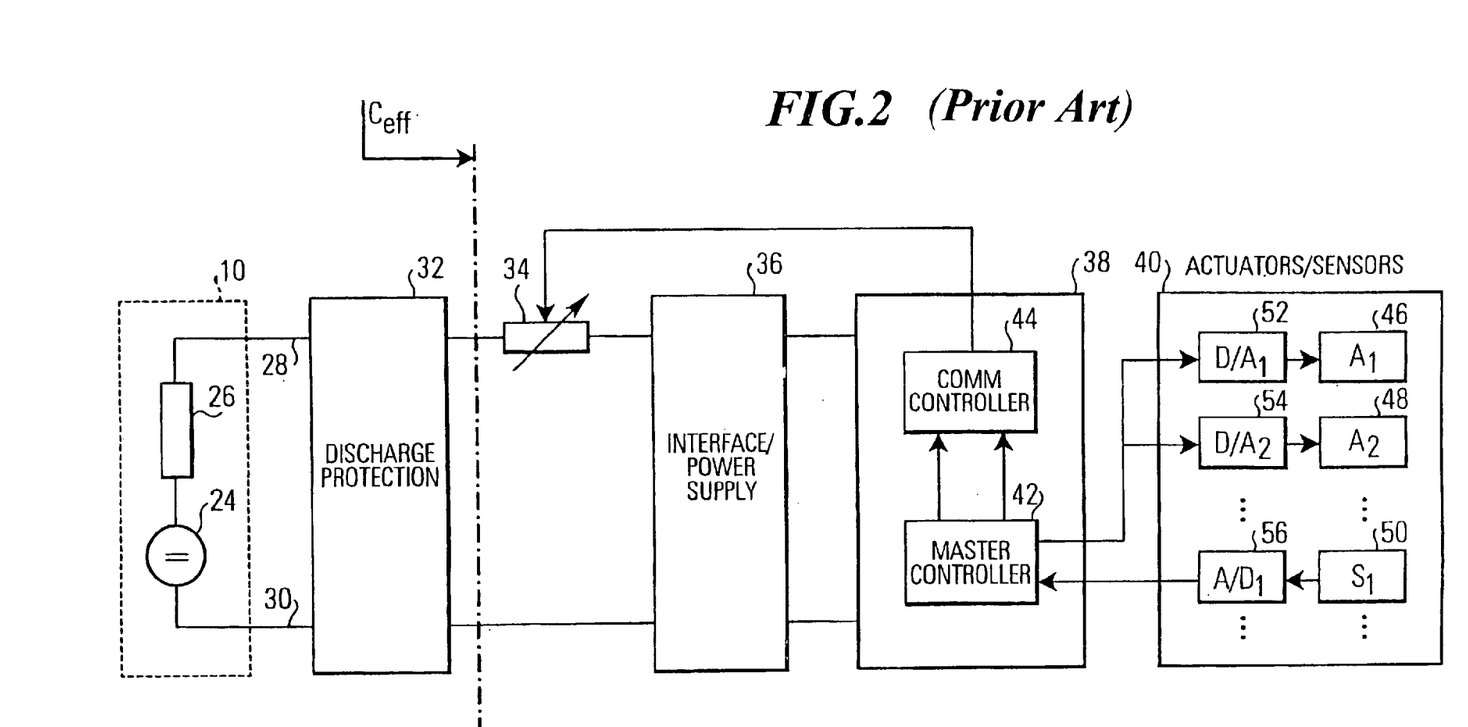
FIG. 2 shows a schematic circuit diagram of the field device shown in FIG. 1.

FIG. 2 shows a more detailed schematic circuit diagram of the field devices shown in FIG. 1. As shown in FIG. 2, the intrinsically safe field bus segment 10 may be summarized into an equivalent circuit diagram with an ideal voltage source 24 and a resistor 26 to model AC voltage impedance and to fulfill intrinsic safety requirements for spark protection, current limitation, and power limitation in an hazardous area.

As also shown in FIG. 2, each field device is connected to the intrinsically safe field bus segment 10 with two wires 28, 30 also being connected to a discharge protection unit 32. At the output of the discharge protection unit 32 there is provided a modulating unit 34 which allows modulation of the operating current flowing into the field device.

The modulating unit 34 is connected in series with a power conversion unit 36 that is adapted to map the operating current flowing over the modulating unit 34 into a suitable power supply signal for a controller unit 38 connected to the output of the power conversion unit 36 and an actuator/sensor unit 40 being controlled by the controller unit 38.

As also shown in FIG. 2, the controller unit 38 is divided into a master controller and a communication controller 44. While the communication controller 44 controls the operating current modulating unit 34 to achieve a modulation of the operating current and therefore exchange of information between the intrinsically safe field bus segment 10 and the field device, the main control of the field device is carried out by the master controller 42.

Therefore, the master controller 42 not only controls the communication controller 44 but also controls either actuators 46, 48 or a sensor 50 in the actuator/sensor 40. For each actuator 46, 48 there is provided a dedicated digital/analog converter unit 52, 54, while for the sensor 50 there is provided an analog/digital converter 56.

Figure 3:
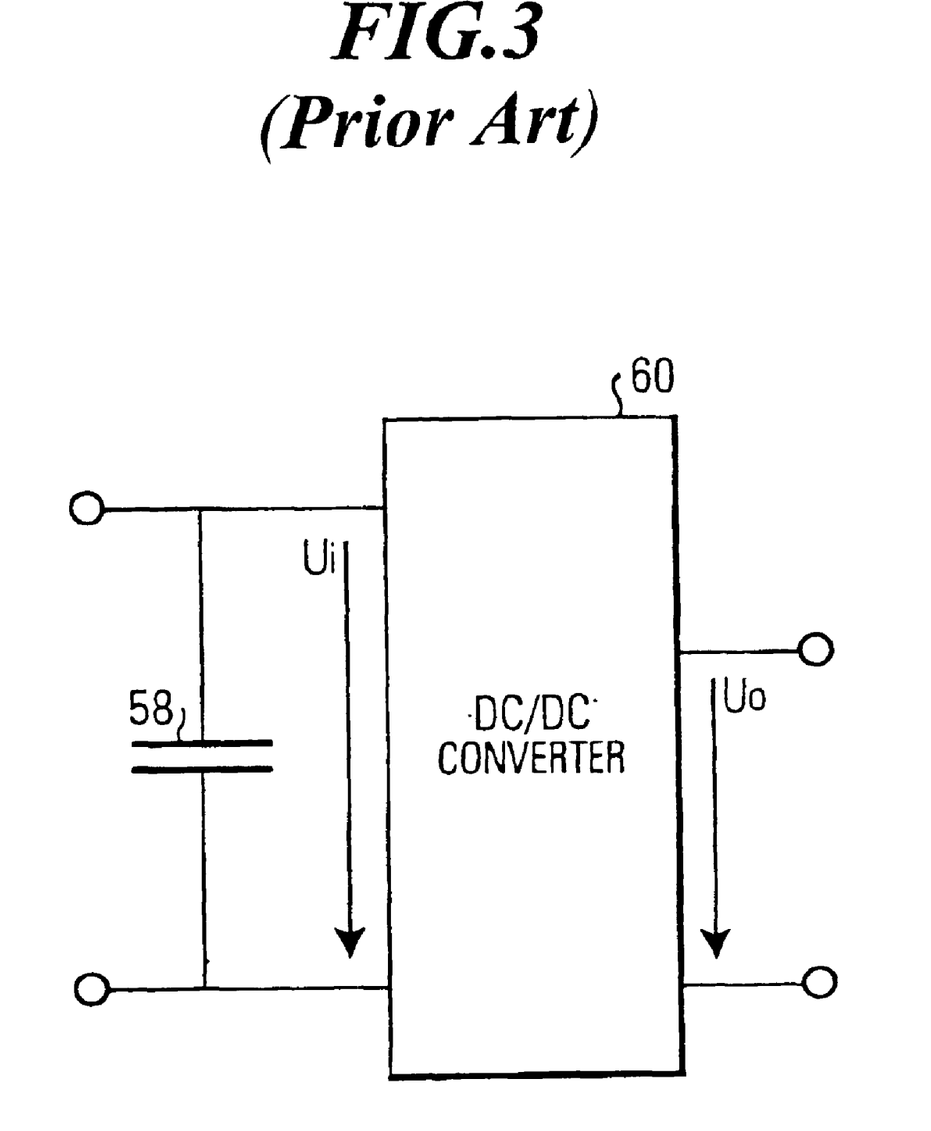
FIG. 3 shows a schematic diagram of the power converter unit shown in FIG. 2.

FIG. 3 shows a more detailed schematic circuit diagram of the power converter unit 36 shown in FIG. 2. As shown in FIG. 3, the power conversion unit 36 comprises a capacitor 58 connected across the input terminals of a DC/DC converter 60. Operatively, the capacitor 58 achieves a stabilization of the input voltage Ui to the DC/DC converter 60. The output voltage Uo of the DC/DC converter 60 is then forwarded to the subsequent controller unit 38.

Operatively, each field device 20, 22 connected to the intrinsically safe field bus segment 10 receives an operating current from the intrinsically safe field bus segment 10. When sending information from the field device to the intrinsically safe field bus segment 10, the current value for the operating current is determined through the modulating unit 34 under control of the communication controller 44. In other words, according to the control signal supplied from the communication controller 44 to the modulating unit 34, the operating current supplied to the field device and thus also the voltage of the intrinsically safe field bus segment 10 varies to achieve digital communication.

Further, to receive information in the field device the communication controller 44 maintains the resistance value of the modulating unit 34 constant. Therefore, in case a different field device triggers a change of the voltage on the intrinsically safe field bus segment 10 the remaining field device(s) connected to this intrinsically safe field bus segment 10 may detect this change of the voltage via the connection lines 28, 30 for further processing thereof in the control unit 38. This digital communication mechanism is used to provide the master controller 42 in each field device with control information for activation of the actuators and/or sensors for manufacturing process control and surveillance.

As also shown in FIG. 2, each field device presents an effective capacitance Ceff to the intrinsically safe field bus segment 10. It is for this reason that the discharge protection unit 32 is inserted between the intrinsically safe field bus segment 10 and the field device to avoid a discharge of the effective capacitance Ceff onto the intrinsically safe field bus segment 10 and therefore a disturbance of the communication process. Another reason is to avoid an overall capacitance on the intrinsically safe field bus segment 10 that might lead to the generation of sparks when somewhere a short circuit occurs on the intrinsically safe field bus segment 10.

On the other hand, in case the voltage of the intrinsically safe field bus segment 10 breaks down and therefore also the power supply to each field device, this power supply failure is not detected immediately by the controller unit 38 shown in FIG. 2 due to the energy stored in the field device, e.g., in the capacitor 58 shown in FIG. 3 or other capacitive/inductive circuit components in the field device stabilizing internal DC voltage. It is for this reason that there occurs a delay between a decrease of the voltage on the intrinsically safe field bus segment 10 and the detection thereof at the controller unit 38 in case of a power supply failure. However, once the controller unit 38 detects such a power supply failure it is not possible to store data in internal memories of the controller unit 38 that may be, e.g., related to internal states of the controller unit or sensed process variables or stored actuator command values since no more energy is available within the field device to carry out such a data saving procedure.

In other words, since the controller unit 38 detects a power supply failure only via the signal supplied from the power conversion unit. 36 (i.e., an internal component of the field device) this detection is delayed with respect to the actual power supply failure on the intrinsically safe field bus segment 10 so that valuable time for the saving of internal data and actuator command values and sensed process variables in the controller unit 38 is lost.

SUMMARY

In one general aspect, a power supply failure on the intrinsically safe field bus is detected through detection of a signal that is in direct relationship to the voltage on the intrinsically safe field bus segment without any delay caused by energy storage, rather than internally within a field device.

This technique makes use of the signals at internal nodes of the discharge protection unit of the field device that are not affected by the effective capacitance of the field device. This provides for detection of a power supply failure on the intrinsically safe field bus of a manufacturing process control system in an efficient manner.

For this reason, as soon as a power supply failure occurs on the intrinsically safe field bus segment, a node signal will decline simultaneously with the voltage of the intrinsically safe field bus segment. It may therefore be used as an indication of power supply failure.

An important achievement of the described technique is to avoid the impact of internal energy storing elements (e.g., capacitors) on the power failure supply detection by deriving an interrupt signal for power supply failure indication in the first circuit stage of the field device for direct supply to the controller unit. Therefore, immediately on decline of, e.g., the voltage on the intrinsically safe field bus segment, the controller unit becomes aware of such a power supply failure.

Since a certain time interval expires between breakdown of the voltage on the intrinsically safe field bus segment and the power supply to the controller unit due to the energy stored internally in the field device, this time interval may be used to save data stored in the controller unit, e.g., command data for the actuators, measurement data from the sensors or internal states thereof. Therefore, a controlled restart of the field device after recovery of the energy supply thereto is provided. Also, the described technique allows significant improvement of the safety characteristic of the field device as any undefined controller states (e.g., false command values for the actuators) may be strictly avoided.

Yet another important advantage is (as internal states, command and measurement data are saved) that the field device is fully operative immediately after recovery of the energy supplied thereto, thus avoiding time consuming resetting mechanisms in the manufacturing process control system or, even worse, an uncontrolled operation in the manufacturing field.

In one implementation, the discharge protection unit may include at least two rectifying elements inserted into the current path of the operating current with identical conducting directions being connected in series. Either an input signal or an output signal to a selected rectifying element may then be supplied as an interrupt signal to the controller unit for a power supply failure detection.

The use of a cascade of rectifying elements with an identical conducting correction enables an easy variation of the redundancy level in the discharge protection unit, i.e. the degree to which a discharge of energy from the field device onto the control bus is avoided. The higher the number of the rectifier elements, the higher the redundancy level and degree of protection.

The discharge protection unit may include four rectifying elements connected in a full wave rectifier bridge network topology. An additional rectifying element also may be connected to a bridge arm node of the rectifier bridge network to increase the discharge protection redundancy level.

The use of a bridge network topology allows adaptation to different bus voltage polarities when connecting the field device to the intrinsically safe field bus segment. This implementation is particularly useful when considering different communication standards that use different bus polarities.

Also, when a further rectifier element is connected to the bridge arm node of the full wave rectifier bridge, intrinsic safety may be increased since the additional rectifier element blocks reverse current flow and related discharge of energy from the field device to the intrinsically safe field bus segment.

An additional discharge protection element may be inserted into the line connecting an interrupt signal output terminal of the discharge protection unit and the controller unit.

Increasing the intrinsic safety through insertion of rectifier elements into a current path also may be applied to the supply of the interrupt signal to the controller unit. In other words, the provision of a discharge protection element in the line for the supply of the interrupt signal to the controller unit allows achievement of the same level of intrinsic safety for the supply of the operating current to the field device and the supply of the interrupt signal to the controller unit.

Triggering of the interrupt at the controller unit and the internal saving procedure in the controller unit may be achieved using predetermined thresholds that are selected such that the interrupt signal is safely issued and a safe storage of internal states after a power supply failure is ensured. Thus, the described techniques provide the ability to detect a power supply failure on the intrinsically safe field bus as soon as possible to ensure that enough energy for the saving of internal states in the control unit of the field device is available.

In another implementation, upon receipt of the power supply interrupt, the controller unit turns off those power consumers in the field device which are not necessarily involved in the data saving procedure, e.g., liquid crystal displays or LED diodes.

The described power management techniques achieve a longer time period for the saving of important data in the controller unit of the field device and thus a contribution to intrinsic safety of the field device.

The method and saving of internal states and data may be carried out according to a predetermined priority scheme. The method is particularly useful when data of different relevance and importance are stored in the memory of the controller unit Typically, in view of scarce energy resources, the described techniques may be configured to initially save the most important data and to subsequently save data of less relevance.

Here, it should be noted that different priorities may exist for different applications and that the method may be suited to improve operable safety for different applications through adaptation of predetermined priorities for the saving of internal data/states for each single application.

In another implementation, a computer program product may be directly loadable into the internal memory of a field device controller comprising software code portions for performing the method when the product is run on the field device controller.

Therefore, the described techniques also may be implemented on computer or processor systems. In conclusion, such implementation leads to the provision of computer program products for use with a computer system or more specifically a processor comprised in, e.g., a field device controller.

Programs defining the functions of the described techniques can be delivered to a computer/processor in many forms, including, but not limited to, information permanently stored on non-writable storage media, e.g., read only memory devices such as ROM or CD ROM discs readable by processors or computer I/O attachments; information stored on writable storage media, such as floppy discs and hard drives; or information conveyed to a computer/processor through communication media such as networks, telephone networks, or the Internet through modems or other interface devices. It should be understood that such media, when carrying processor readable instructions implementing the concept represent alternate implementations.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 4:
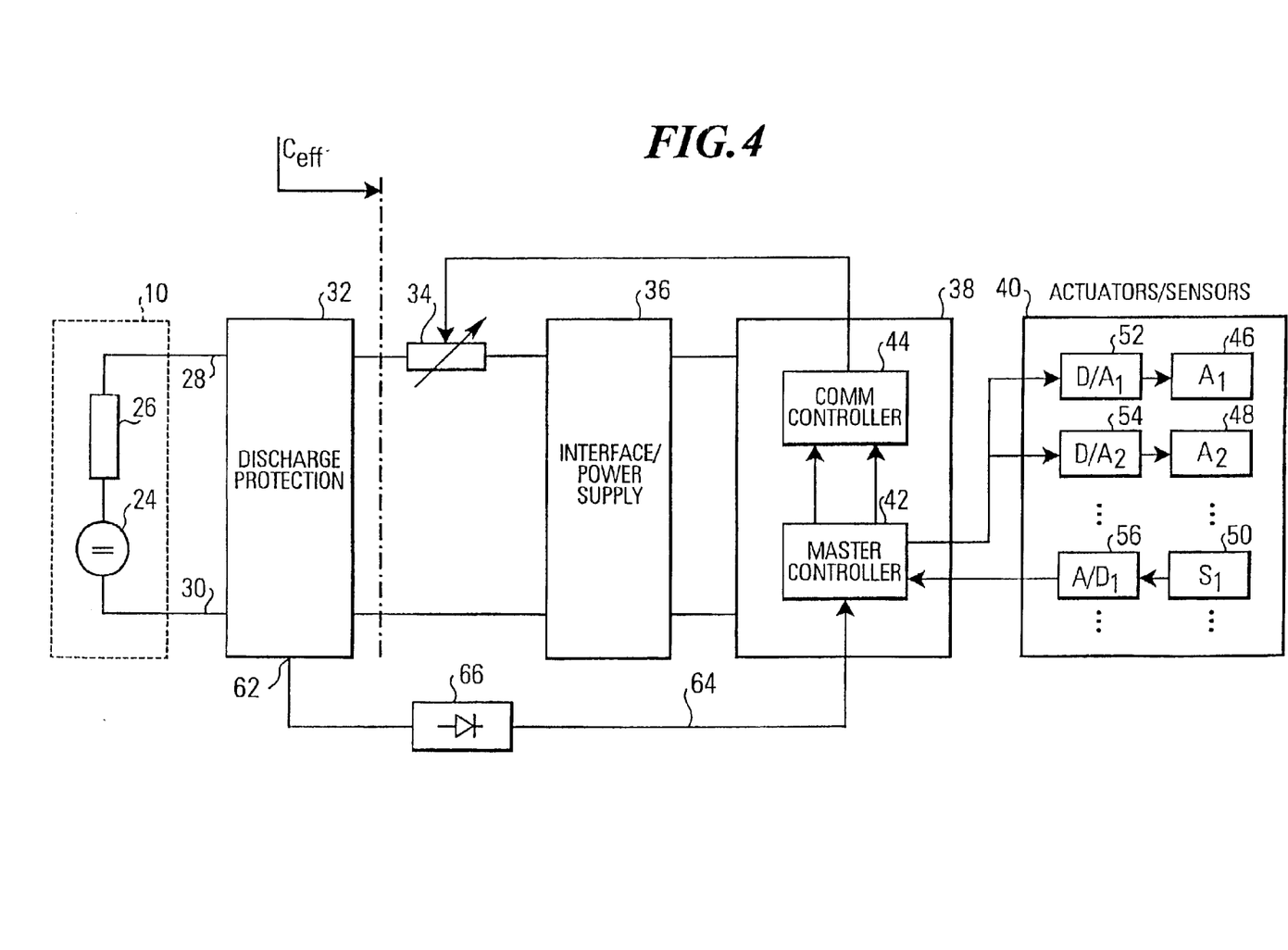
FIG. 4 shows a schematic circuit diagram of a field device.

FIG. 4 shows a schematic diagram for a field device according to the present invention. Those parts being identical to those previously discussed with respect to FIG. 4 or corresponding thereto are denoted using the same reference numerals and the explanation thereof will be omitted to avoid redundancy.

As shown in FIG. 4, the discharge protection unit 32 according to the present invention is provided with an interrupt signal output terminal 62. As will be explained in more detail in the following, this interrupt signal output terminal 62 may be connected to any internal network node of the discharge protection unit 32, i.e. also to the input terminal or the output terminal of the discharge protection unit 32.

As also shown in FIG. 4, there is provided a interrupt signal line 64 connecting the interrupt signal output terminal 62 with the controller unit 38 of the field device. Preferably, a discharge protecting element 66 is inserted into the interrupt signal supply line 64 to avoid reverse current flow onto the intrinsically safe field bus segment 10 and therefore discharge of energy.

It is important to note that the discharge protection unit 32 only contains rectifying elements and therefore no energy storing components, e.g., capacitors. Therefore, as soon as the voltage on the intrinsically safe field bus segment 10 declines due to a power supply failure, the signal levels at internal nodes in the discharge protection unit 32 will decrease accordingly.

Operatively, as one of the internal node signals is connected to the interrupt signal output terminal 62 there is available an interrupt signal that decreases immediately when the bus voltage on the intrinsically safe field bus segment 10 decreases.

In other words, the signal at the interrupt signal output terminal 62 decreases instantly in case of a power supply failure while the output signal of the power conversion unit 36 supplying the controller unit 38 decreases only after a certain time period when the energy stored in the field device (e.g., in the capacitor 58 shown in FIG. 3) is consumed.

It is an important aspect of the present invention that this time period may then be used to save internal states and/or command data and/or measurement data stored in the controller unit. One option is to store such data in a non-volatile memory (not shown) of the controller unit 38, e.g., an EEPROM memory. This will typically require some milliseconds of time.

Figure 5:
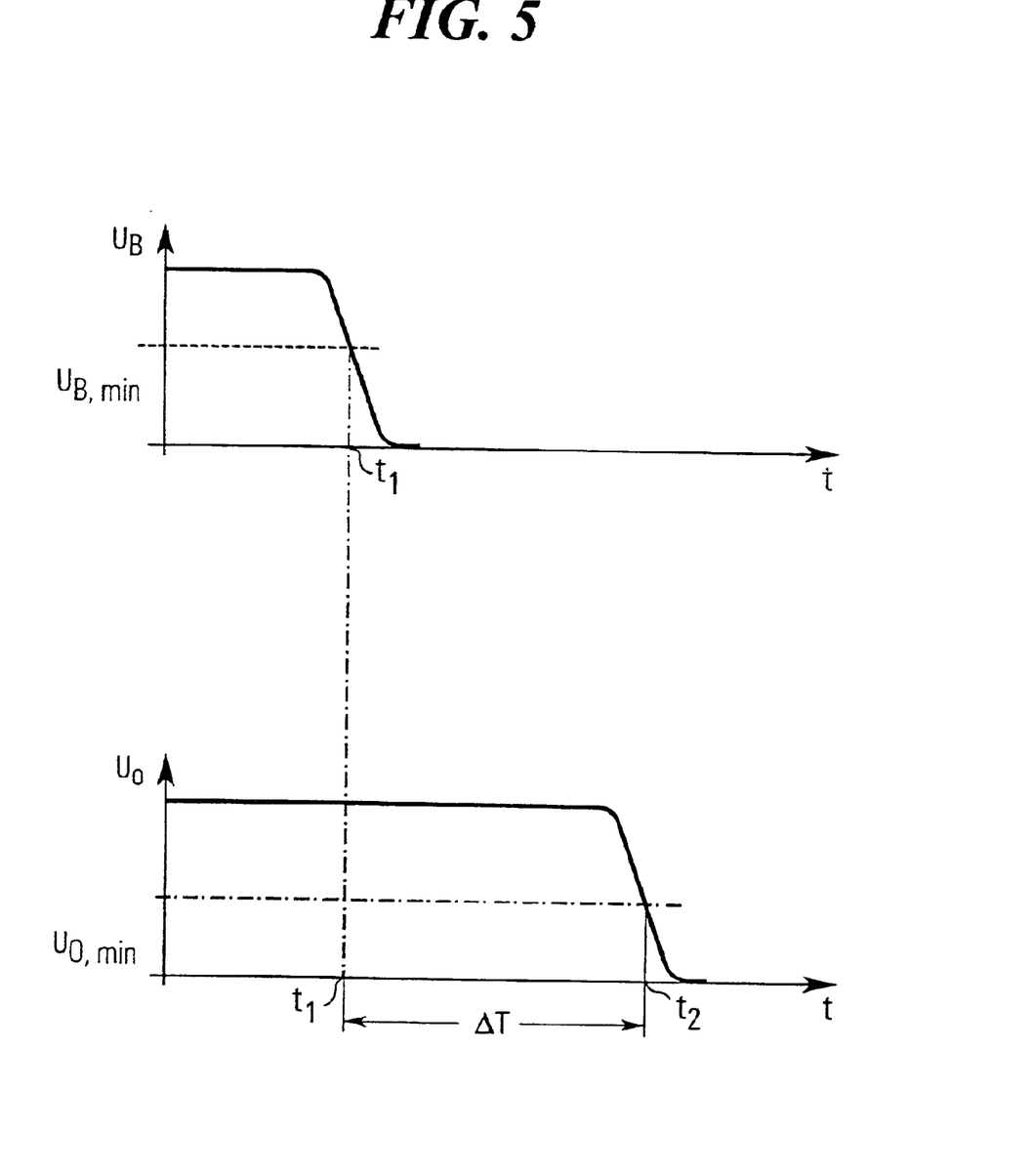
FIG. 5 shows a signal waveform diagram illustrating the impact of a power supply failure in the power supply signal to the controller in the field device shown in FIG. 4.

FIG. 5 shows a signal waveform diagram illustrating the impact of a power supply failure on the intrinsically safe field bus segment onto the supply signal of the controller unit in more detail. In particular, the upper part of FIG. 5 shows the voltage on the intrinsically safe field bus segment 10 and the lower part of FIG. 5 shows the supply signal Uo for the controller unit 38 of the field device.

When a power supply failure occurs on the intrinsically safe field bus segment 10 the bus voltage will decrease from the nominal value to approximately a value of zero. To avoid every minor decrease of the bus voltage being interpreted as power supply failure, a threshold comparison between the bus voltage UB and a minimum bus voltage UB,min (i.e. predetermined first threshold) is carried out to avoid an incorrect interrupt at the controller unit.

As shown in FIG. 5, in case the bus voltage UB becomes lower than the minimum required bus voltage UB,min at time t1 an interrupt signal is provided via the interrupt signal output terminal 62 of the discharge protection unit 32 to the controller unit 38 of the field device, e.g., in the form of a non-maskable interrupt.

As also shown in FIG. 5, the supply signal Uo at the output of the power conversion unit 36 only decreases after a certain period of time $\Delta T$ since energy is internally stored in the field device and may be used for further power supply of the controller unit also after occurrence of a power supply failure.

Therefore, during this period of time $\Delta T$ the controller unit 38 may be further operated to run a shutdown procedure and save internal states and/or command data and/or measurement data.

To ensure that such a saving procedure is always run under definite operative conditions, the saving procedure should be terminated when the supply signal to the controller unit 38 gets lower than a minimum required supply signal Uo,min at point of time t2.

Here, it should be noted that according to the described techniques the specific values of the minimum bus voltage UB,min and the minimum required supply signal Uo,min for the controller unit 38 are freely selectable parameters.

For example, the higher UB,min and the lower the value of Uo,min, the longer the time period $\Delta T$ will be, however, at the risk of a slightly increased chance of an incorrect interrupt signal or an operation of the controller unit 38 during the period $\Delta T$ with a supply signal Uo being too small. To the contrary, in case the value of UB,min is decreased and the value of Uo,min is increased, the risk of an incorrect interrupt is minimized and the controller unit 38 will always carry out a stable saving procedure, however, at the expense of a reduced time period $\Delta T$. In conclusion, there exists a certain design trade off which is typically decided in view of the considered application.

Further, while above the detection of a power supply failure has been discussed with respect to the voltage on the intrinsically safe field bus segment 10 it should be clear that the same results may be achieved through detection of the operating current flowing into the field device, e.g., through detection of the current passing over the modulating unit 34. This current value may then be processed in an analog manner for a power failure detection. Alternatively, the signal may be supplied to a comparator (not shown) for a threshold comparison to derive a digital output indicating a power failure.

Further, in case the field device is provided with a dedicated energy buffer for supply of energy to the circuit components of the field device on occurrence of a power failure as described in the co-pending application "Load Voltage Control For A Field Device" assigned to the same applicant and incorporated herein by reference, also the discharge signal to such a dedicated energy buffer may be used for power failure detection.

Figure 6:
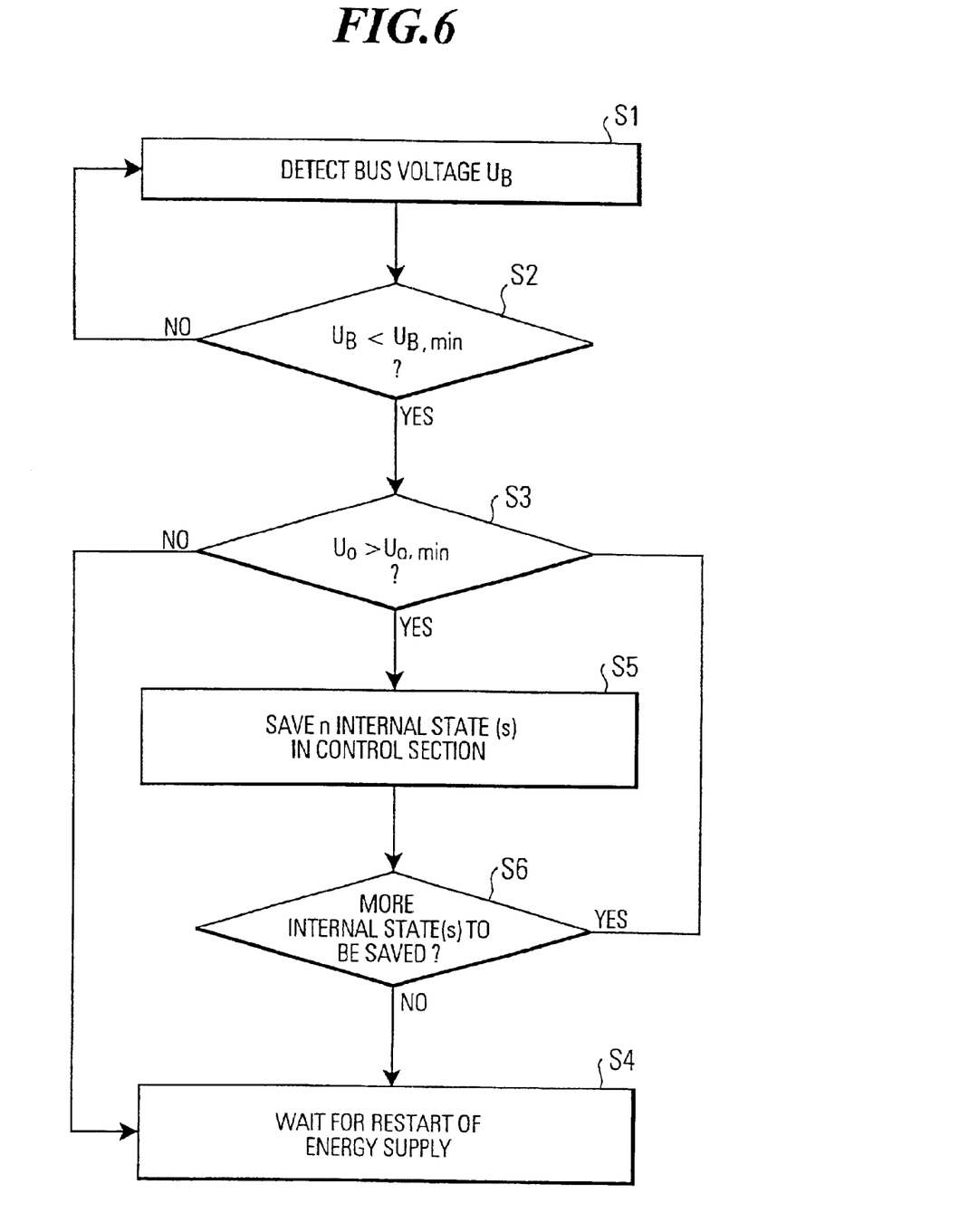
FIG. 6 shows a flowchart of the method to operate a field device.

FIG. 6 shows a flowchart of the method of operating a field device in more detail. While the flowchart refers to the bus voltage on the intrinsically safe field bus, it should be noted that it equivalently applies to the alternatives outlined above, i.e. the monitoring of an operating current flowing into the field device or the monitoring of a supply current flowing out of an energy buffer provided in the field device.

As shown in FIG. 6, the voltage on the intrinsically safe field bus segment 10 is detected in step S1 and compared with a minimum required bus voltage UB,min in step S2. In case the bus voltage is higher than the minimum required value, the detection of the bus voltage is continued in step S1.

Concurrently to the step S1 and step S2 the signal available at the interrupt signal output terminal 62 of the discharge prevention unit 32 is supplied to the controller unit 38 of the field device. Therefore, the master controller 42 of the controller unit 38 may continuously scan the signal supplied via the interrupt signal output terminal 62 without any delay through energy storing circuit components of the field device, as outlined above.

As also shown in FIG. 6, subsequent to the detection of a power supply failure in step S2 it is checked to determine whether the supply signal to the controller unit 32 of the field device is larger than the required minimum value Uo,min in step S3. If this is not the case (e.g., in the rare case where a power supply failure occurs immediately after start of operation of the field device) the process shown in FIG. 6 branches off to step S4 to wait for the restart of the energy supply to the field device. Otherwise, the saving of internal states and/or command data and/or measurement data is started in step S5.

According to the implementation shown in FIG. 6, it is assumed that the storage of internal states/data is segmented so that a further interrogation to determine whether more internal states are to be saved may be carried out in step S6. In the affirmative case, it is then checked whether still enough energy is available for the controller unit 38 of the field device. If no more internal states/data are/is to be saved or no more energy is available, the procedure branches off to step S4 to wait for restart of energy. Otherwise, step S5 is repeated to write further internal states/data into the non-volatile memory of the controller unit 38.

The segmentation of the saving of internal states/data as shown in FIG. 6 allows for a repeated evaluation of the energy available for the controller unit 38 of the field device running the saving procedure. Therefore, no saving of internal states/data is carried out in case the energy supplied to the controller unit is not lying in an operative range to avoid incorrect storage of states/data and therefore a subsequent incorrect operation of the field device. This contributes to the overall safe operation of the field device.

Still further, the sequential approach to the saving of internal states/data allows the introduction of a priority scheme where more important states/data are saved before less relevant states/data with less impact on the overall safe operation of the field device.

Yet another implementation considers the structure of the software running in the controller. Here, the software comprises a plurality of so-called function blocks according to a variety of protocols. According to the described techniques it is also possible to map the interrupt signal submitted to the controller unit for a power supply failure detection into a variable. This variable would be one of many transmitter variables available to function blocks executing in the field device. In case this variable indicates a power supply failure each function block could then take one last action before the shut down procedure and in the field device.

Figure 7:
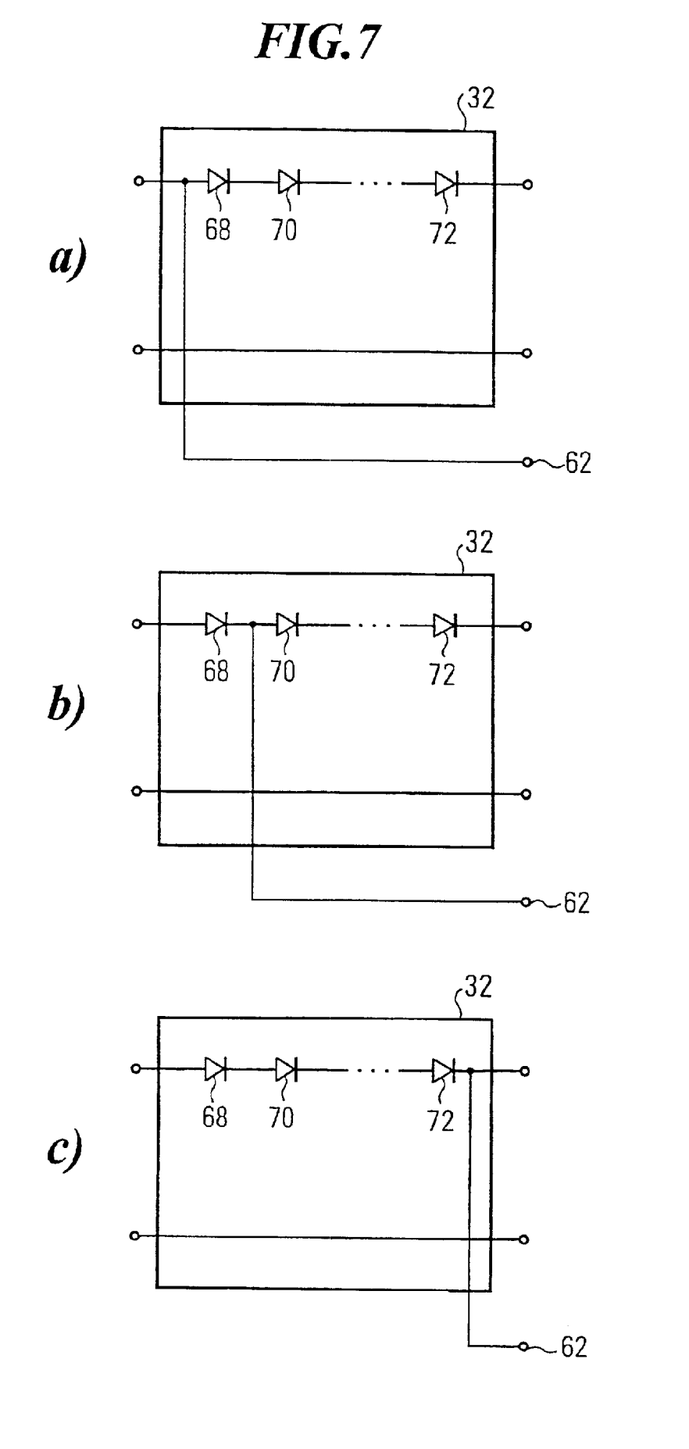
FIG. 7 shows a discharge protection unit providing an interrupt signal.

FIGS. 7(a) to (c) show a discharge protection unit providing an interrupt signal. As shown in FIG. 7, the first discharge protection unit uses a cascade of diodes 68, 70, . . . , 72 for discharge protection from the field device onto the intrinsically safe field bus segment 10.

Further, the interrupt signal may be branched off either from the input terminal, any intermediate node between the rectifying elements (e.g., diodes) of the discharge protection unit or the output terminal thereof, as shown in FIGS. 7(a) to (c).

Since the discharge protection unit shown in FIG. 7 comprises no energy storing circuit components, the voltage signal either at the input terminal, the output terminal or any internal node thereof will decrease concurrently to the bus voltage on the intrinsically safe field bus segment 10 on occurrence of a power supply failure.

As already described above, the interrupt signal output terminal 62 may be connected to a discharge protection element having a conducting direction running from the discharge protection unit 32 to the controller unit 38 to guarantee intrinsic safety in the field device also when detecting the bus voltage on the intrinsically safe bus signal 10.

Figure 8:
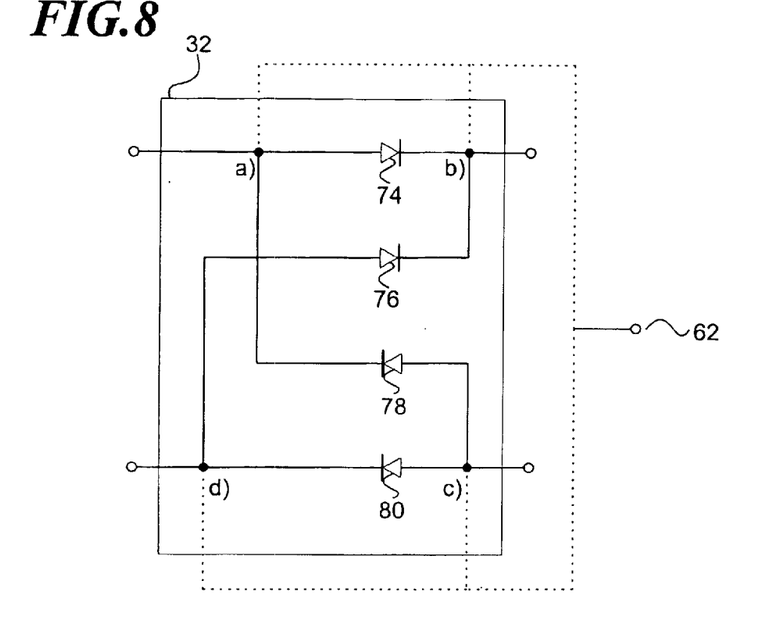
FIG. 8 shows another discharge protection unit providing an interrupt signal.

FIG. 8 shows another discharge protecting unit providing an interrupt signal. As shown in FIG. 8, the discharge protection unit is of the full bridge rectifier type, i.e. a Graetz-diode-bridge, and comprises four rectifying elements 74 to 80, e.g., diodes. The different rectifying elements are arranged in a bridge-like form (shown in the lower part of FIG. 8) between nodes a and d constituting the input terminals of the discharge protection unit 32 and further between nodes b, c constituting the output terminals of the discharge protection unit 32. Since such a circuit arrangement is commonly known in the art, no further explanation thereof must be given.

Insofar as the described techniques are concerned, the discharge protection unit 32 is provided with an additional interrupt signal output terminal 62 that is connected selectively to either node a, b, c, or d. Therefore, the node signal at any node a to d may be supplied to the controller unit 38 as an interrupt signal to trigger the non-maskable interrupt at the controller unit.

Figure 9:
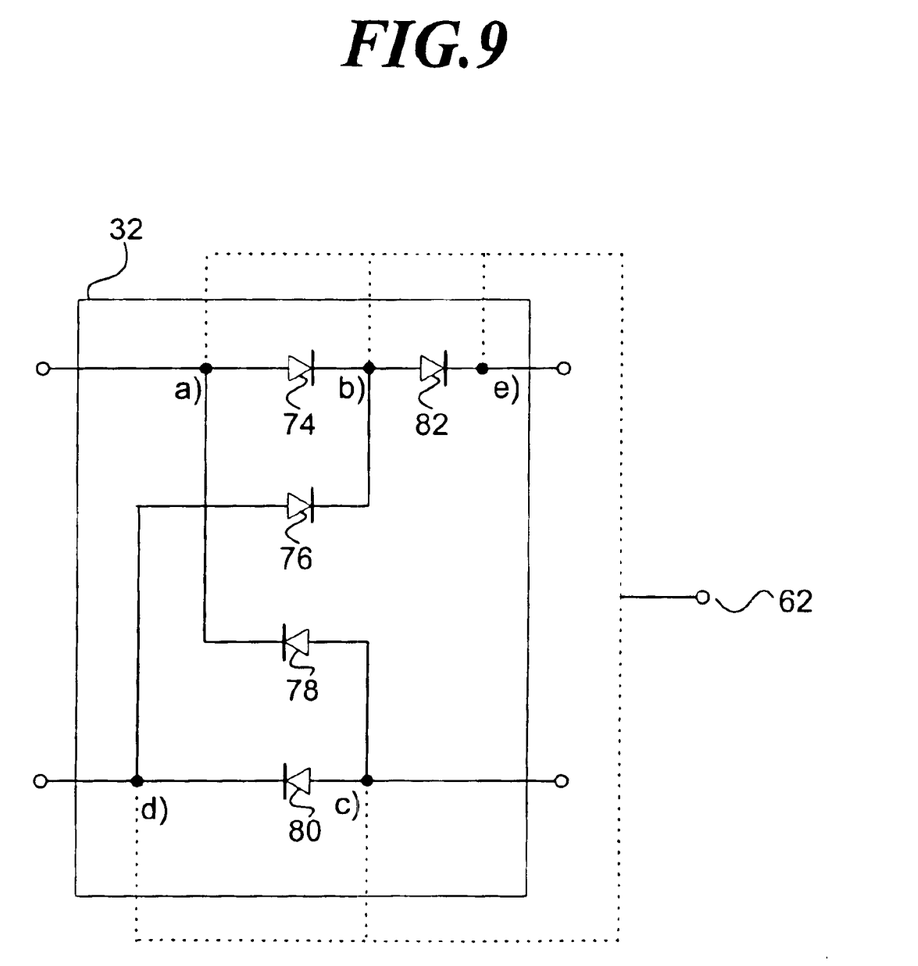
FIG. 9 shows another discharge protecting unit providing an interrupt signal.

FIG. 9 shows another discharge protection unit providing an interrupt signal. Those parts being identical to the circuit components described with respect to FIG. 8 are denoted using the same reference numerals and description thereof is omitted. As shown in FIG. 9, the discharge protecting unit shown in FIG. 8 differs over the previously described discharge protecting unit shown in FIG. 8 in that an additional rectifying element 82 (e.g., a diode) is provided between node b and the output terminal node e of the discharge protecting unit 32 with its conducting direction to the output node e of the discharge protecting unit 32. This additional rectifying element 82 increases the intrinsic safety of the field device due to the additional rectifying element supporting a discharge protection from the field device onto the intrinsically safe field bus segment. The interrupt signal output terminal 62 of the discharge protection unit 32 may be connected to any of the nodes a to e shown in FIG. 9 for a power failure detection.

Figure 10:
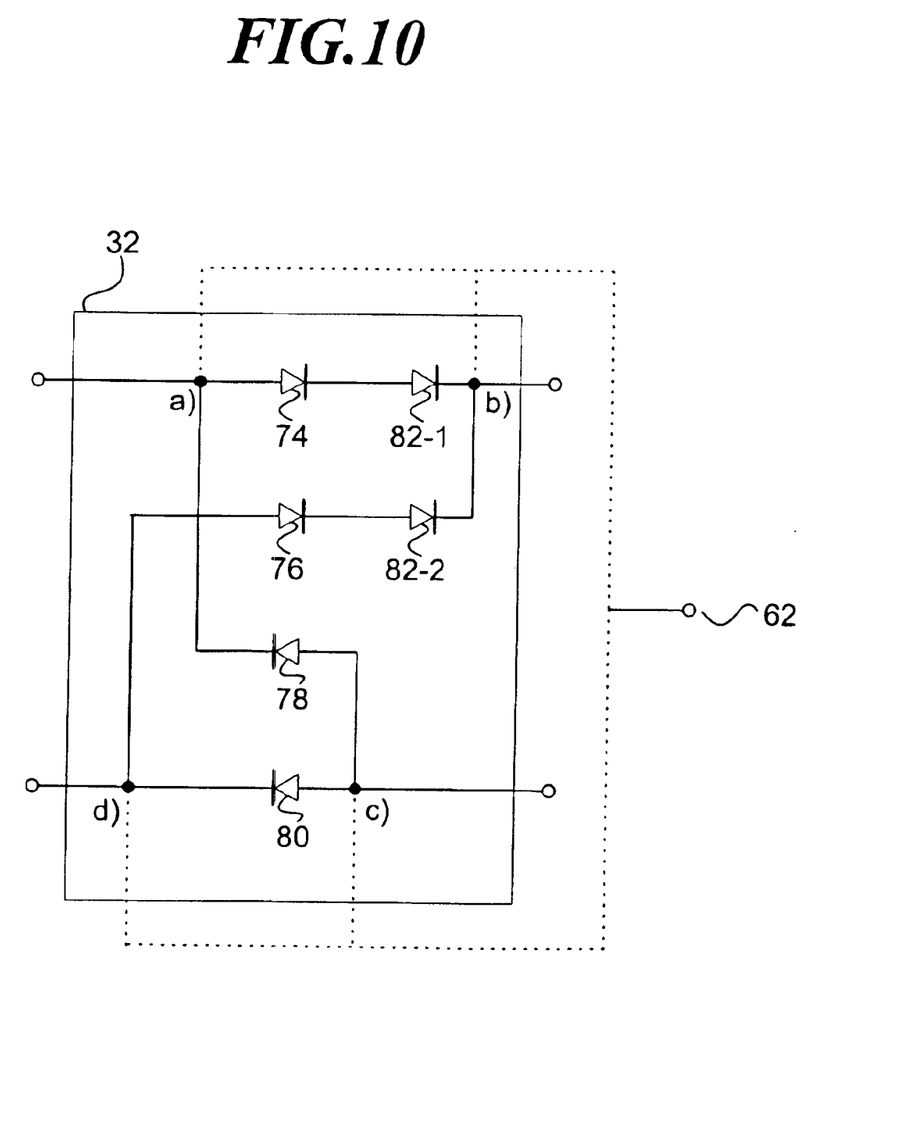
FIG. 10 shows another discharge protecting unit providing an interrupt signal.

FIG. 10 shows yet another discharge protection unit providing an interrupt signal. Again, those circuit elements that have been previously described with respect to FIGS. 8 and 9 are denoted using the same reference numerals and description thereof is omitted. The discharge protection unit shown in FIG. 10 differs over the previously described discharge protection unit shown in FIG. 9 in that the additional rectifying element 82 is moved over node b into the branch a-b and d-b of the full wave rectifier bridge. The discharge protection unit 32 shown in FIG. 10 achieves an increased level of discharge protection through provision of the additional rectifying elements 82-1, 82-2. The interrupt signal output terminal 62 may be connected to any node a, b, c, or d or any further internal node, e.g. between rectifying elements 74/82-1 and/or between rectifying elements 76/82-2.

Figure 11:
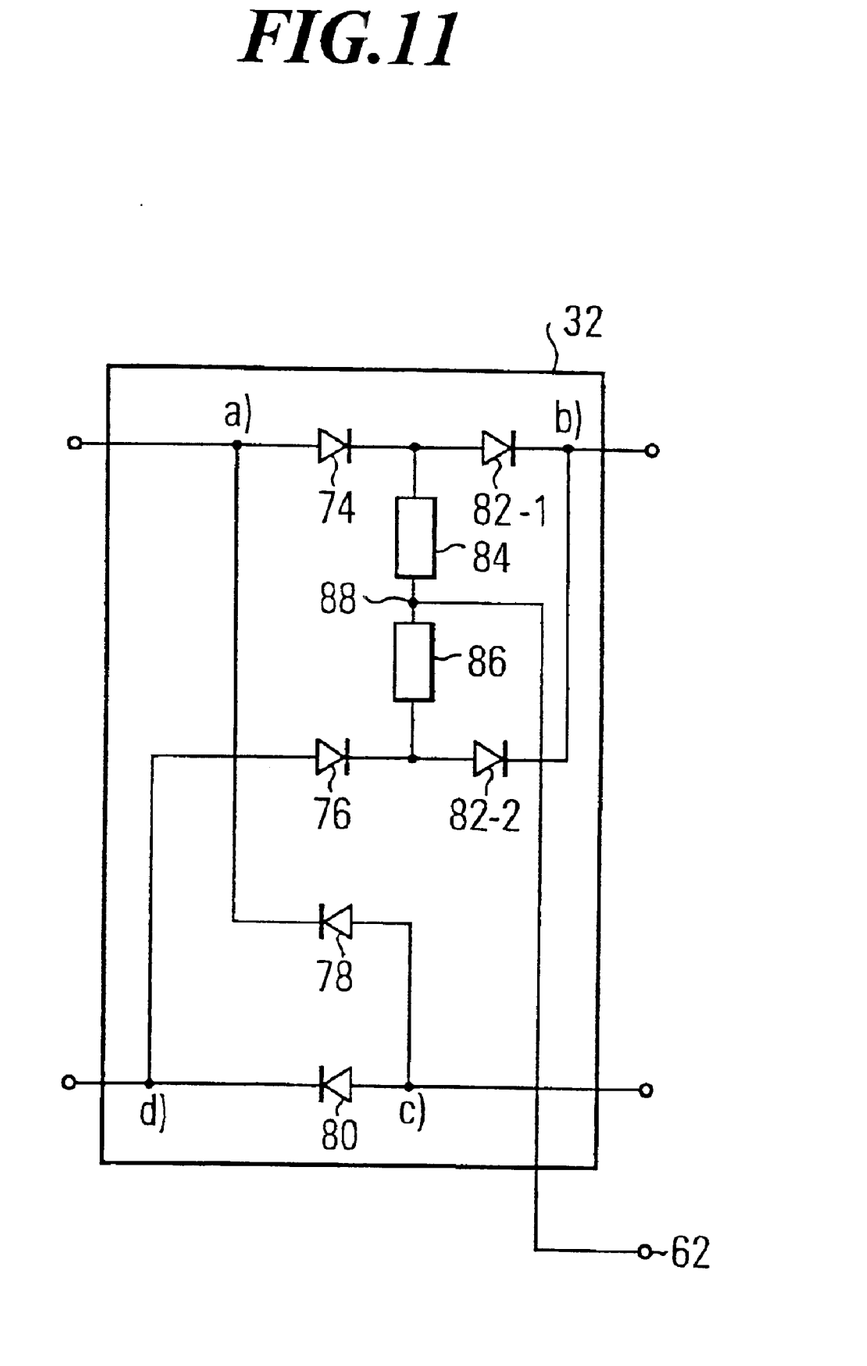
FIG. 11 shows yet another discharge protection unit providing an interrupt signal.

FIG. 11 shows yet another discharge protection unit providing an interrupt signal. Those circuit elements being identical to the discharge protection unit discussed previously with respect to FIG. 10 are denoted using the same reference numerals and description thereof is omitted. The discharge protection unit 32 shown in FIG. 11 differs over the discharge protecting unit shown in FIG. 10 in that a first resistor 84 and a second resistor 86 are connected in series between a line connecting the rectifier element 74 and the rectifier element 82-1 and a line connecting the rectifying element 76 and the rectifying element 82-2. As shown in FIG. 11, a signal at the network node 88 between the first resistor 84 and the second resistor 86 is used as interrupt signal at the interrupt signal output terminal 62. Operatively, the additional resistors 84 and 86 allow for the determination of an appropriate interrupt signal level at the interrupt signal output terminal 62.

While the described techniques have been described with reference to circuit diagrams of implementations of the field device, it should be noted that clearly the described techniques may also be implemented digitally by, for example, operating a field device using a microcontroller. In this case, a computer program product is directly loadable into the internal memory of the controller unit and comprises software code portions for implementing the method.

A number of implementations have been described. Nevertheless, it will be understood that various modifications may be made. Accordingly, other implementations are within the scope of the following claims.

What is claimed is:

1. A field device for monitoring a manufacturing process and/or for actuating manufacturing process variables, the field device comprising:
   a discharge protection unit connected to a control bus formed by a two-wire interface that provides an operating current supplying both a power signal for powering the field device and a communications signal for directing an operation of the field device, the discharge protection unit being adapted to supply the operating current from the control bus to the field device such that the discharge protection unit inhibits a discharge of energy stored in the field device to the control bus; and
   a controller unit adapted to control the operation of the field device and being powered with the operating current from the control bus, the controller unit being operable to store control data related to an operation of the field device, using an internal memory of the controller unit;
   wherein the discharge protection unit comprises at least two rectifying elements inserted into the current path of the operating current with identical conducting directions, and a signal associated with a selected rectifying element is supplied as an interrupt signal to the controller unit for power supply failure detection, such that the control data is stored within the internal memory in response to the power supply failure detection.

2. The field device of claim 1 wherein the discharge protection unit is provided with an interrupt signal output terminal connected to the selected rectifying element.

3. The field device of claim 1 further comprising an operating current modulating unit adapted to vary an effective resistance presented through the field device to the control bus and serially connected to the discharge protection unit for information exchange to/from the field device through operating current modulation under control of the controller unit.

4. The field device of claim 2 further comprising an operating current modulating unit adapted to vary an effective resistance presented through the field device to the control bus and serially connected to the discharge protection unit for information exchange to/from the field device through operating current modulation under control of the controller unit.

5. The field device of claim 3 further comprising a power conversion unit connected in series between the operating current modulating unit and the controller unit for supplying power to the field device.

6. The field device of claim 1 wherein the discharge protection unit comprises three rectifying elements connected in series.

7. The field device of claim 1 wherein the discharge protection unit comprises four rectifying elements connected in a full wave rectifier bridge network topology.

8. The field device of to claim 7 wherein the discharge protection unit further comprises an additional rectifying element having an input connected to a bridge arm node of the full wave rectifier bridge and an output connected to the operating current modulation unit.

9. The field device of claim 1 wherein:
   the discharge protection unit comprises six rectifying elements connected in a full wave rectifier bridge network topology, wherein the full wave rectifier bridge has a first node and a second node connected to the control bus, a third node connected to a downstream circuit component of the field device, and a fourth node connected to ground;
   a first rectifying element having a first conduction direction is inserted between the first node and the third node;
   a second rectifying element having a second conduction direction is inserted between the fourth node and the second node;
   a third and fourth rectifying element having the second conduction direction, respectively, are inserted between the first node and the third node; and
   a fifth rectifying element and a sixth rectifying element having the first conduction direction are inserted between the third node and the second node.

10. The field device of claim 9 further comprising a first resistor and a second resistor connected in series between a line connecting the third rectifying element and the fourth rectifying element and a line connecting the fifth rectifying element and the sixth rectifying element, wherein the signal at the network node between the first resistor and the second resistor is used as an interrupt signal at the interrupt signal output terminal.

11. The field device of claim 1 further comprising a discharge protection element inserted in the line connecting the interrupt signal output terminal and the controller unit.

12. The field device of claim 1 wherein each rectifying element and/or the discharge protection element is a diode.

13. A method of operating a field device for monitoring a manufacturing process and/or for actuating manufacturing process variables, the method comprising:
   continuously monitoring a voltage on a control bus connecting the field device with a central controller or an operating current flowing from the control bus into the field device, where the control bus includes a two-wire interface that provides an operating current supplying both a power signal for powering the field device and a communications signal for directing an operation of the field device;
   generating a power supply interrupt signal when the monitored voltage/operating current decreases beyond a predetermined first threshold ($U_{B,min}$);
   routing the power supply interrupt signal to a field device controller so as to circumvent an effective capacitance of the field device, such that a decrease in power being supplied by the control bus is detected at the field device controller without being substantially affected by a delay associated with the effective capacitance; and
   saving internal states in an internal memory of a field device controller after supplying the power supply interrupt signal to the field device controller.

14. The method of claim 13 wherein internal states of the field device controller are saved until the supply signal for the field device controller decreases beyond a predetermined second threshold ($U_{o,min}$) or data for all internal states are saved.

15. The method of claim 13 wherein, upon receiving the power supply interrupt signal, the field device controller turns off power consumers in the field device to reduce power consumption.

16. The method of claim 14 wherein, upon receiving the power supply interrupt signal, the field device controller turns off power consumers in the field device to reduce power consumption.

17. The method of claim 13 wherein saving internal states is carried out according to a predetermined priority scheme.

18. The method of claim 14 wherein saving internal states is carried out according to a predetermined priority scheme.

19. The method of claim 15 wherein saving internal states is carried out according to a predetermined priority scheme.

20. A computer program product directly loadable into a memory of a field device controller, the product including software code for causing the field device to monitor a manufacturing process and/or to actuate manufacturing process variables, by causing the field device controller to:

continuously monitor a voltage on a control bus connecting the field device with a central controller or an operating current flowing from the control bus into the field device, where the control bus includes formed by a two-wire interface that provides an operating current supplying both a power signal for powering the field device and a communications signal for directing an operation of the field device;

generate a power supply interrupt signal when the monitored voltage/operating current decreases beyond a predetermined first threshold ($U_{B,min}$);

route the power supply interrupt signal to a field device controller so as to circumvent an effective capacitance of the field device, such that a decrease in power being supplied by the control bus is detected at the field device controller without being substantially affected by a delay associated with the effective capacitance; and save internal states in an internal memory of a field device controller after supplying the power supply interrupt signal to the field device controller.

21. The computer program product of claim 20 wherein the software code causes internal states of the field device controller to be saved until the supply signal for the field device controller decreases beyond a predetermined second threshold ($U_{o,min}$) or data for all internal states are saved.

22. The computer program product of claim 20 wherein, upon receiving the power supply interrupt signal, the software code causes the field device controller to turn off power consumers in the field device to reduce power consumption.

23. The computer program product of claim 20 wherein the software code causes the saving of internal states to be carried out according to a predetermined priority scheme.

* * * * *